United States Patent
Acharya et al.

(10) Patent No.: US 10,188,130 B2
(45) Date of Patent: Jan. 29, 2019

(54) EDTA—FREE MAYONNAISE FOR THE PRODUCTION THEREOF

(71) Applicant: Conopco, Inc., Englewood Cliffs, NJ (US)

(72) Inventors: Parag Acharya, Voorburg (NL); Sara Isabel Da Fonseca Selgas Martins Van Der Maaten, Rotterdam (NL); Robert Vreeker, Melissant (NL)

(73) Assignee: CONOPCO, INC., Englewood Cliffs, NJ (US)

( * ) Notice: Subject to any disclaimer, the term of this patent is extended or adjusted under 35 U.S.C. 154(b) by 0 days.

(21) Appl. No.: 15/960,877

(22) Filed: Apr. 24, 2018

(65) Prior Publication Data

US 2018/0235266 A1 Aug. 23, 2018

Related U.S. Application Data

(62) Division of application No. 14/406,366, filed as application No. PCT/EP2013/061159 on May 30, 2013, now Pat. No. 9,949,501.

(30) Foreign Application Priority Data

Jun. 21, 2012 (EP) .................................. 12172980

(51) Int. Cl.
*A23L 27/60* (2016.01)
*A23D 7/005* (2006.01)
*A23D 7/01* (2006.01)

(52) U.S. Cl.
CPC ............ *A23L 27/60* (2016.08); *A23D 7/0053* (2013.01); *A23D 7/011* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 4,873,112 A | 10/1989 | Mitchell et al. | |
| 5,976,587 A | 2/1999 | Yamauchi et al. | |
| 7,029,719 B1 | 4/2006 | Nakajima et al. | |
| 2002/0016317 A1 | 2/2002 | Schul et al. | |
| 2004/0033289 A1 | 2/2004 | Selmer-Olsen | |
| 2004/0037940 A1 | 2/2004 | Kudou et al. | |
| 2004/0142089 A1 | 7/2004 | Hisatomi | |
| 2009/0117238 A1 | 5/2009 | Ido et al. | |
| 2009/0258133 A1* | 10/2009 | Bodor .................... | A23L 27/60 426/602 |
| 2010/0028518 A1 | 2/2010 | West et al. | |
| 2010/0159089 A1 | 6/2010 | Lis et al. | |
| 2011/0274818 A1 | 11/2011 | Saito et al. | |
| 2012/0135125 A1 | 5/2012 | Muschiolik et al. | |
| 2013/0052315 A1 | 2/2013 | Tiwari et al. | |

FOREIGN PATENT DOCUMENTS

| | | |
|---|---|---|
| EP | 1222957 | 7/2002 |
| ES | 2307390 | 9/2009 |
| JP | 2006067951 | 3/2006 |
| JP | 2010195925 | 9/2010 |
| KR | 20020063991 | 8/2002 |
| KR | 100792811 | 1/2008 |
| KR | 20090105744 | 10/2009 |
| RO | 122471 | 7/2009 |
| SU | 1692522 | 11/1991 |
| WO | WO9925209 | 5/1999 |
| WO | WO2008118850 | 10/2008 |
| WO | WO2009150675 | 12/2009 |

OTHER PUBLICATIONS

Nimalaratne et al.; Food aromatic amino acids in egg yolk show antioxidant properties; Food Chemistry; 2011; pp. 155-161 (also as XP028227306); 129.
Pesto Rosso with Balsamic Vinegar from Modena; Database GNPD Mintel; Aug. 2011; 1606311.
Balsamic Salad Dressing; Database GNPD Mintel (Sep. 2011); Sep. 2011; 1620886.
Chavi Sperber; Balsamic Mayonnaise Dipping Sauce; Joy of Kosher website; Jun. 27, 2011; 1; .; World Intellectual Property Org. (WIPO).
Tagliazucchi et al.; Antioxidant properties of traditional balsamic vinegar and boiled must model systems; Eur Food Res Technol; 2008; pp. 835-843; vol. 227.
Irene Lockwood; Balsamic Mayonnaise; tastebook.com; Sep. 26, 2009; 1-3.
Balsamic Mayonnaise; Tastykitchen.com; 2012; p. 1, http: /tastykitchen.com / recipes /condiments/balsamic-mayonnaise/ ;.
Verzelloni et al.; Relationship between the antioxidant properties and the phenolic and flavonoid content in traditional balsamic vinegar; Food Chemistry 105 (2007) ; Jul. 19, 2007; 564-571; 105.
Modena Vinegar Vinaigrette; Database GNPD Mintel (May 2010); May 2010; 1316449.
Extra Virgin Olive Oil & Balsamic Vinegar Light Vinaigrette; Database GNPD Mintel (Aug. 2011); Aug. 2011; 1616844.
Jayawardena et al.; The Total antioxidant capacity, total phenolics contact and starch huydrolase inhibitory activity of fruit juices following pepsin(gastric) and pancreatin (duodenal) digestion; Journal of Consumer Protection and Food Safety; 2015; pp. 349-357.
Saba ; Fine Cooking; 2016; pp. 1 of 1; .; .; United States of America.
Dharmadhikari; Composition of Grapes; Wine Grape Chemistry WMA021; 2014; pp. 1-10; .; .; United States of America.

(Continued)

*Primary Examiner* — Tamra L. Dicus
(74) *Attorney, Agent, or Firm* — Foley & Lardner LLP

(57) ABSTRACT

An EDTA-free mayonnaise having excellent oil oxidation stability can be prepared by incorporating an effective amount of reduced grape juice in combination with a source of acetic acid and egg protein. The invention relates to a method of preparing an EDTA-free mayonnaise, said method comprising incorporating into the mayonnaise reduced grape juice in an amount providing 5-2,000 µg gallic acid equivalents per milliliter of aqueous phase; a source of acetic acid in an amount providing 0.2-15% acetic acid by weight of the continuous aqueous phase; and egg protein in an amount of 0.02-4% by weight of the mayonnaise.

17 Claims, No Drawings

(56) References Cited

OTHER PUBLICATIONS

Singleton et al.; Analysis of Total Phenols and Other Oxidation Substrates and Antioxidants by Means of Folin-Ciocalteu Reagent; Methods in Enzymology; 1999; 152-178; 299.
Piva et al.; Heat-induced chemical, physical and functional changes during grape must cooking; Food Chemistry; 2008; 1057-1065; 106; Italy.
Montevecchi et al.; Occurrence and evolution of amino acids during grape must cooking; Food Chemistry; 2010; 69-77; 121; Italy.
Falcone et al.; Sugar Conversion Induced by the Application of Heat to Grape Must; J. Agric. Food Chem; Jul. 14, 2010; 8680-8691; 58-15; Italy.
Tagliazucchi et al.; Contribution of Melanoidins to the Antioxidant Activity of Traditional Balsamic Vinegar During Aging; Journal of Food Biochemistry; 2010; 1061-1078; 34-5.
Iizuka et al.; Inhibitory Effects of Balsamic Vinegar on LDL Oxidation and Lipid Accumulation in THP-1 Macrophages; Journal of Nutritional Science and Vitaminology ; 2010; 421-427; 56-6.
Search Report in EP12172980; dated Nov. 12, 2012.
IPRP2 in PCTEP2013061159; dated Oct. 21, 2014.
Verzelloni et al.; Changes in major antioxidant compounds during aging of traditional balsamic vinegar; Food Chemistry; 2010; 152-171; 34-1.
Written Opinion in PCTEP2013061159; dated Jun. 27, 2014.
Written Opinion in EP12172980; dated Nov. 12, 2012.
Peinado et al.; Antioxidant activity of different phenolics fractions isolated in must from Pedro Ximenez grapes at different stages of the off-vine drying process; Food Chemistry; 2009; 1050-1055; 114.

\* cited by examiner

EDTA—FREE MAYONNAISE FOR THE PRODUCTION THEREOF

CROSS-REFERENCE TO RELATED PATENT APPLICATIONS

This application is a Divisional of U.S. application Ser. No. 14/406,366 filed Dec. 8, 2014, which is a U.S. national phase application under 35 U.S.C. § 371 of PCT/EP2013/061159, filed May 30, 2013, which claims priority to European Patent Office Application 12172980.0, filed Jun. 21, 2012, incorporated herein by reference in their entireties.

TECHNICAL FIELD OF THE INVENTION

The present invention relates to a method of preparing an EDTA-free mayonnaise, said method comprising incorporating into the mayonnaise a combination of reduced grape juice, a source of acetic acid and protein.

The invention also relates to the use of reduced grape juice as an EDTA-replacer in mayonnaise and to a process of preparing an improved EDTA replacer from reduced grape juice.

BACKGROUND OF THE INVENTION

Oil oxidation is a undesired process that commonly occurs in oil containing food products. If allowed to progress freely, oil oxidation causes these food products to develop an undesirable, rancid flavour. Unsaturated and especially polyunsaturated fatty acid residues that abundantly present in vegetable oils are the prime source of rancid smelling oxidation products.

Oil oxidations are strongly catalyzed by free metal ions, such as iron and copper ions. Traditionally, ethylenediaminetetraacetic acid (EDTA) has been used in food products to prevent oil oxidation and spoilage due to its capacity to chelate metals. EDTA, however, is a synthetic or artificial ingredient.

Within the food industry an increasing effort is made to remove artificial ingredients from food products and to replace them with natural alternatives. Owing to its effectiveness, reasonable cost, and lack of viable alternatives, however, EDTA has so far been one of the more difficult artificial ingredients to replace. Attempts so far to replace or remove EDTA from foods and beverages have yielded disappointing results.

US 2010/0028518 describes an oxidatively stable comestible, such as a mayonnaise, that is substantially free of EDTA and that comprises an effective amount of nicotianamine.

US 2010/0159089 describes an oxidatively stable comestible, such as an mayonnaise, that is substantially free of EDTA and that comprises a hydrolyzed polysaccharide having a plurality of side chains with carboxylic acid groups in an amount effective to provide oxidative stability therein; the polysaccharide is hydrolyzed such that the average polysaccharide chain length is about 2 to about 4 molecules and has an average molecular weight of about 300 to about 900 Daltons.

The use of balsamic vinegar in edible emulsions is known. WO 2010/124870 A1, WO 2008/118850 A2, and KR 100 792 811 B1 disclose salad dressings containing balsamic vinegar. Also various salad dressings containing balsamic vinegar are commercially available from supermarkets. However, mayonnaise-type emulsions containing balsamic vinegar are not known. Mayonnaises generally distinguish from salad dressings by being more viscous and having a pale, slightly yellow colour, and by containing ingredients originating from eggs, in particular egg yolk.

It is known that traditional balsamic vinegar has strong antioxidant activity. This antioxidant activity is related to the positive effects of the antioxidants in vivo, after consumption of the balsamic vinegar. There is no suggestion to use balsamic vinegar as an ingredient in emulsions to prevent oil oxidation. Tagliazucchi et al. (Journal of Food Biochemistry, 34 (2010), 1061-1078) observe that during aging of traditional balsamic vinegar low molecular weight compounds are progressively incorporated into the melanoidins skeleton and may contribute significantly to the antioxidant activity of high-molecular-weight melanoidins. According to the authors among these compounds, it has been shown that antioxidant phenolic compounds are progressively incorporated into the melanoidins skeleton during the aging. The authors further conclude that apart from their bioavailability traditional balsamic vinegar melanoidins and low-molecular weight antioxidants may exert their effect on the digestive tract where they can play an important role in protecting the gastrointestinal tract itself from oxidative damage.

Tagliazucchi et al. (European Food Research and Technology, 227 (2008), 835-843) describe the extraction of high molecular weight (>10 kDa) melanoidins from traditional balsamic vinegar. Both melanoidins and polyphenols in traditional balsamic vinegar each contribute about 45% to the antioxidant activity of the traditional balsamic vinegar.

Verzelloni et al. (Food Chemistry, 105 (2007), 564-571) disclose that antioxidant activity of the vinegar aqueous fractions that cannot be attributed to phenolic acids is due to the Maillard products or other antioxidant compounds.

SUMMARY OF THE INVENTION

The inventors have found that an EDTA-free mayonnaise having excellent oil oxidation stability can be prepared by incorporating an effective amount of reduced grape juice in combination with a source of acetic acid and egg protein. Thus, one aspect of the invention relates to a method of preparing an EDTA-free mayonnaise, said method comprising incorporating into the mayonnaise reduced grape juice in an amount providing 5-2,000 µg gallic acid equivalents per milliliter of aqueous phase; a source of acetic acid in an amount providing 0.2-15% acetic acid by weight of the continuous aqueous phase; and egg protein in an amount of 0.02-4% by weight of the mayonnaise.

Polyphenols are contained in reduced grape juice in appreciable amounts. The polyphenol content of reduced grape juice can adequately be expressed in terms of gallic acid equivalents. Consequently, the amount gallic acid equivalents provided by the reduced grape juice is a good measure for the amount reduced grape juice that is used in the preparation of the mayonnaise.

Besides polyphenols, reduced grape juice contains substantial quantities of fructose, glucose, organic acids (e.g. tartaric acid and malic acid) and substances formed during the reduction process, notably melanoidins and volatile Maillard reaction products (e.g. hydroxymethylfurfuraldehyde). Melanoidins are brown, high molecular weight heterogeneous polymers that are the final product of the (heat-induced) Maillard reaction between reducing sugars and amino acids.

Melanoidins are formed by cyclizations, dehydrations, retroaldolisations, rearrangements, isomerisations, and condensations of Maillard reaction products, but none has been fully characterised yet. Therefore it is necessary to apply indirect strategies to assess structural differences in the melanoidin backbone.

Although the inventors do not wish to be bound by theory, it is believed that the melanoidins contained in reduced grape juice are capable of binding metal cations—such as copper and iron cations—that catalyze the oxidation of unsaturated fatty acids. By binding these metal cations oil lipid oxidation can be minimized effectively, provided the melanoidins are kept away from the oil-water-interface. The latter can be achieved by the incorporation of proteins as proteins tend to accumulate at the oil-water interface, thereby preventing the melanoidin-metal complex to come into direct contact with the oil droplets.

The invention also relates to an EDTA-free mayonnaise obtainable by the aforementioned method. Also provided is the use of reduced grape juice as an EDTA-replacer in mayonnaise, said use comprising incorporating the reduced grape juice in the mayonnaise in an amount providing 5-2,000 μg gallic acid equivalents per milliliter of aqueous phase.

The invention also relates to an EDTA-free mayonnaise comprising reduced grape juice in an amount providing 5-2,000 μg gallic acid equivalents per milliliter of aqueous phase; a source of acetic acid in an amount providing 0.2-15% acetic acid by weight of the continuous aqueous phase; and egg protein in an amount of 0.02-4% by weight of the mayonnaise.

DETAILED DESCRIPTION OF THE INVENTION

A first aspect of the present invention relates to a method of preparing an EDTA-free mayonnaise that comprises 5-85 wt. % of dispersed oil phase and 15-95 wt. % of continuous aqueous phase, said method comprising incorporating into the mayonnaise:
- a reduced grape juice in an amount providing 5-2,000 μg gallic acid equivalents per milliliter of aqueous phase, said reduced grape juice containing at least 50% by weight of dry matter of monosaccharides selected from glucose, fructose and combinations thereof;
- a source of acetic acid is incorporated in an amount providing 0.2-15% acetic acid by weight of the continuous aqueous phase, said source of acetic acid containing at least 20% acetic acid by weight of dry matter; and
- egg protein in an amount of 0.02-4% by weight of mayonnaise.

Mayonnaise is generally known as a thick, creamy sauce that can be used as a condiment with other foods. Mayonnaise is a stable water-continuous emulsion of vegetable oil, egg yolk and either vinegar or lemon juice. Lecithin in the egg yolk is the emulsifier to stably disperse the oil in the aqueous phase. Many other ingredients can be added to mayonnaise, like herbs, spices, mustard, vegetables, and thickeners. In many countries the term mayonnaise may only be used in case the emulsion conforms to the 'standard of identity', which defines the composition of a mayonnaise. For example, the standard of identity may define a minimum oil level, and a minimum egg yolk amount. Also mayonnaise-like products having oil levels lower than defined in a standard of identity can be considered to be mayonnaises. These kind of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with oil levels ranging from 5% to 85% by weight of the product. Mayonnaises in the context of the present invention do not necessarily need to conform to a standard of identity in any country.

The term "EDTA-free" as used herein means that the mayonnaise contains less than 10 ppm of ethylenediaminetetraacetic acid (EDTA).

The term "oil" as used herein refers to lipids selected from the group of triglycerides, diglycerides, monoglycerides, and free fatty acids. The term "oil" encompasses lipids that are liquid at ambient temperature as well as lipids that are partially or wholly solid at ambient temperature.

The term "reduced grape juice" as used herein refers to a syrup that has been prepared by boiling grape juice from which seeds and skin have been removed until the volume of the juice has been reduced by at least 30 wt. % by evaporation. The reduced grape juice of the present invention is optionally fermented to produce ethanol and acetic acid. Bacteria of the genus *Acetobacter* are capable of converting ethanol into acetic acid.

The term "balsamic vinegar" as used herein refers to a reduced grape juice that has been fermented to yield a fermented product containing at least 2 wt. % acetic acid.

The term "acetic acid" as used herein, unless indicated otherwise, refers to free acetic acid in dissociated or protonated form.

Whenever reference is made herein to "gallic acid equivalents" what is meant is the amount of gallic acid equivalents as determined by the Folin-Ciocalteu assay.

Gallic acid (3,4,5-trihydroxybenzoic acid) is a phenolic acid that is used as a standard for determining the phenol content of various analyses by the Folin-Ciocalteu assay.

As suitable Folin-Ciocalteu assay is described by V. L. Singleton et al. (*Analysis of total phenols and other oxidation substrates and antioxidants by means of Folin-Ciocalteu reagent,* Methods in Enzymology 299, 152-178 (1999)). The following is an example of a suitably protocol: 20 μL of reduce grape juice samples are pipetted into separate cuvettes. 1.58 mL millipore water and 100 μL Folin-Ciocalteu reagent are added to the cuvettes. After mixing and waiting for 8 minutes, 300 μL of a 20 wt % sodium carbonate solution is added. The solutions are left standing at 20° C. for 1 hour and absorbance of each solution was measured at 765 nm. A calibration curve is made following the same procedure using, for instance, gallic acid solutions at 0, 50, 100, 150, 250, 500, 1000, 2500 and 5000 mg/L. Results are reported as Gallic Acid Equivalents.

The Folin-Ciocalteu assay is responsive to any reducing substance present in the vinegar. Reducing sugars, tartaric acid, Maillard reaction products, melanoidins, etc. may all cause interferences. A correction for the presence of these components can be made by preparing a reference sample containing these components in the same concentration as the original sample and by subjecting the reference sample to the Folin-Ciocalteu test (as described above). From the absorbance at 765 nm the correction factor can be determined.

The EDTA-free mayonnaise of the present invention preferably contains less than 5 ppm EDTA, more preferably less than 2 ppm EDTA. Most preferably, the EDTA-mayonnaise contains no EDTA.

The benefits of the present invention may be realized in mayonnaise of varying oil content. Typically, the mayonnaise contains 10-83 wt. % of dispersed oil phase and 17-90 wt. % of a continuous aqueous phase. Most preferably, the mayonnaise contains 13-82 wt. % of dispersed oil phase and 18-87 wt. % of a continuous aqueous phase. Together the dispersed oil phase and the continuous aqueous phase typically constitute at least 90 wt. %, more preferably at least 95 wt. % and most preferably 100 wt. % of the mayonnaise.

The reduced grape juice that is employed in the present invention may be derived from white or red grapes. The reduced grape juice typically has a dry matter content of at least 20 wt. %. More preferably, the reduced grape juice has a dry matter content of 25-95 wt. %, most preferably of 30-90 wt. %.

The reduced grape juice is typically incorporated in the mayonnaise in an amount sufficient to provide 1-50 g of dry matter per kg, more preferably 2-40 g of dry matter per kg, and most preferably 3-25 g of dry matter per kg of mayonnaise.

The reduced grape juice can be incorporated in the mayonnaise as a component of a pre-blend, e.g. a pre-blend of reduced grape juice and the source of acetic acid. An example of such a pre-blend is a mixture of reduced grape juice and wine vinegar such as "Balsamic vinegar of Modena". Balsamic vinegar of Modena is typically prepared by adding red wine vinegar (and optionally flavourings like caramel) to mosto cotto followed by an aging period of 2-36 months. Usually, the mosto cotto represents 20-80 wt. % of the latter vinegar.

The water content of the reduced grape juice typically lies in the range of 0-78 wt. %. More preferably, the reduced grape juice has a water content of 5-75 wt. %, most preferably of 10-70 wt. %.

Examples of reduced grape juices that may be employed in the present method include "Aceto Balsamico Tradizionale" and "mosto cotto". Most preferably, the reduced grape juice is mosto cotto. Mosto cotto contains essentially no acetic acid, notably less than 0.5 wt. % of acetic acid.

The present method of preparing a mayonnaise preferably employs a reduced grape juice that contains substantial levels of phenolic compounds. Typically, the reduced grape juice contains 50-50,000 μg/g, more preferably 300-40,000 μg/g and most preferably 1,000-30,000 μg/g gallic acid equivalents.

Calculated on dry matter the reduced grape juice typically contains 0.2-50 mg/g, more preferably 0.5-30 mg/g gallic acid equivalent.

The reduced grape juice is advantageously incorporated in the mayonnaise in an amount providing 10-1,000 μg gallic acid equivalents per milliliter of aqueous phase, more preferably 12-600 μg gallic acid equivalents per milliliter of aqueous phase, and most preferably 15-400 μg gallic acid equivalents per milliliter of aqueous phase.

The reduced grape juice has a typical phenolic acid profile. The reduce grape juice typically contains phenolic acids in a concentration of 0.03-30 mg per g of dry matter, more preferably of 0.05-20 mg per g of dry matter and most preferably of 0.1-10 mg/g of dry matter, said phenolic acids being selected from gallic acid, protocatecuic acid, p-coumaric acid, syringic acid, vanillic acid, 4-hydroxy benzoic acid, feluric acid, caffeic acid and combinations thereof. Typically, each of the aforementioned phenolic acids is contained in the reduced grape juice in an amount of at least 1%, more preferably of at least 2% and most preferably of at least 3% by weight of the phenolic acids.

Besides phenolic acids, the reduced grape juice typically contains a variety of other substances, such as sugars, pectic substances, proteinaceous matter, organic acids, minerals, caramelization products and Maillard reaction products. Furthermore the reduced grape juice usually contains polyphenols such as anthocyanins and tannins.

The reduced grape juice typically contains 60-95%, more preferably 70-92% and most preferably 75-90% monosaccharides by weight of dry matter, said monosaccharides being selected from fructose, glucose and combinations thereof. Calculated on total composition the reduced grape juice typically contains at least 10 wt. %, more preferably at least 20 wt. % and most preferably at least 30 wt. % of the aforementioned monosaccharides.

Organic acids that are typically contained in reduced grape juice in appreciable amounts include tartaric acid and malic acid. Preferably, the reduced grape juice contains 0.05-4%, more preferably 0.1-2.5% and most preferably 0.15-1.5% dicarboxylic acids by weight of dry matter, said dicarboxylic acids being selected from tartaric acid, malic acid and combinations thereof.

During the reduction of grape juice heat induced reactions such as caramelization and Maillard reactions occur. The Maillard reactions produce a large variety of volatile substances that contribute to the typical cooked notes that develop during the reduction. Typical examples of Maillard reaction products that are formed during the reduction of grape juice are furfural, 5-methyl-2-furaldehyde, 5-hydroxymethylfuraldehyde, 5-acetoxymethylfurfural and 2-furoic acid. According to a particularly preferred embodiment, the reduced grape juice contains 50-25.000 mg per kg of dry matter, more preferably 80-18,000 mg per kg of dry matter and most preferably 100-15,000 mg per kg of dry matter of Maillard reaction products selected from the group of furfural, 5-methyl-2-furaldehyde, 5-hydroxymethylfuraldehyde, 5-acetoxymethylfurfural, 2-furoic acid and combinations thereof.

The caramelization that inevitably occurs during the reduction of the grape juice and also subsequent aging cause the reduced grape juice to develop a very intense, brownish colour, largely because of the formation of melanoidins. As result of this intense colour, application of the reduced grape juice in mayonnaise can lead to undesired colouring of the mayonnaise. The inventors have found that it is feasible to at least partly decolourize the reduced grape juice whilst retaining its ability to prevent undesired lipid oxidation reactions. Such decolouration may be achieved very effectively by removing substances having a molecular weight of more than 10 kDa, e.g. by ultrafiltration. Thus, in accordance with a particularly preferred embodiment, the present method employs a reduced grape juice that contains less than 0.1 wt. %, more preferably less than 0.05 wt. % and most preferably less than 0.01 wt. % of substances having a molecular weight of more than 20 kDa, especially of more than 10 kDa and most preferably of more than 5 kDa. In case the reduced grape juice is used as a component of a pre-blend, then the optional removal of substances having a molecular weight of more than 20 kDa from the reduced grape juice may be performed prior or after mixing of the reduced grape juice and the source of acetic acid.

The reduced grape juice that is preferably used in the method of the invention that contains less than 0.1 wt. % of substances having a molecular weight of more than 20 kDa preferably is prepared by a process comprising:
  providing reduced grape juice;
  filtering the reduced grape juice to remove components having a molecular weight of more than 20 kDa; and
  optionally further treating the filtered juice.

Preferably the filtration leads to the removal of substances having a molecular weight of more than 10 kDa and more preferably of more than 5 kDa. The filtration makes it possible to use the decoloured reduced grape juice at appreciable levels in mayonnaise without substantially affecting the colour of the mayonnaise.

As a result of the filtration, the content of components having a molecular weight of more than 20 kDa expressed by weight of dry matter is reduced by at least a factor 2, more preferably by at least a factor 5 and most preferably by at least a factor 20.

Typically as a result of filtration, the absorbance at 400 nm is decreased by at least a factor 5, more preferably by at least a factor 8 and most preferably by at least a factor 10.

Additionally the reduced grape juice containing less than 0.1 wt. % of substances having a molecular weight of more than 20 kDa has the advantage that it has very good anti-oxidative properties, which even are improved compared to reduced grape juice which does not have a reduced level of compounds having a molecular weight of more than 20 kDa.

The source of acetic acid that is employed in the present invention preferably is a liquid or a powder, most preferably a liquid. The source of acetic acid typically contains 50-100%, more preferably 70-98% and most preferably 80-95% acetic acid by weight of dry matter.

Water typically represents at least 50 wt. %, even more preferably 80-96 wt. % and most preferably 85-94 wt. % of the liquid source of acetic acid.

The source of acetic acid employed in the present method usually contains only a limited amount of monosaccharides. Typically, the source of acetic acid contains less than 3 wt. %, more preferably less than 2 wt. % and most preferably less than 1 wt. % monosaccharides selected from fructose, glucose and combinations thereof. Expressed differently, it is preferred that the source of acetic acid contains less than 15%, more preferably less than 12% and most preferably less than 10% monosaccharides by weight of dry matter, said monosaccharides being selected from fructose, glucose and combinations thereof.

The present method can suitably employ a source of acetic acid that is selected from the group of wine vinegar, sherry vinegar, spirit vinegar, rice vinegar, apple vinegar, malt vinegar and combinations thereof.

The source of acetic acid preferably contains at least 1 wt. %, more preferably at least 2 wt. % and most preferably at least 4 wt. % of acetic acid. The acetic acid content of the source of acetic acid typically does not exceed 60 wt. %.

The source of acetic acid is in an amount providing 0.2-15%, more preferably 0.2-3% acetic acid by weight of the continuous aqueous phase.

Preferably the weight ratio of reduced grape juice to source of acetic acid ranges from 80:20 to 20:80, more preferred the ratio ranges from 80:20 to 40:60.

In order to further improve the oxidative stability of the mayonnaise it can be advantageous to include a natural anti-oxidant, more particularly a natural anti-oxidant selected from rosemary extract, alpha-tocopherol (vitamin E), ascorbic acid (vitamin C) and combinations thereof. Especially in case the amount of reduced grape juice that is employed in the mayonnaise is limited (e.g. providing less than 20 g dry matter per kg of mayonnaise), the additional inclusion of a natural anti-oxidant, especially of rosemary extract, can be very advantageous.

In the present method protein is preferably incorporated in the mayonnaise in a concentration of 0.05-3%, more preferably of 0.2-2.5% and most preferably of 0.4-2% by weight of mayonnaise.

Egg protein is incorporated in the mayonnaise prepared in the method of the invention. In principle any protein can be incorporated in the EDTA-free mayonnaise that is capable of promoting the formation of an oil-in-water emulsion. Preferably, an additional protein is selected from the group consisting of dairy protein, legume protein and combinations thereof. Even more preferably, an additional protein is whey protein.

The dispersed oil phase of the mayonnaise that is produced by the present method typically has a volume averaged geometric-mean diameter of 0.5-20 μm, more particularly of 2-7 μm. The volume averaged geometric mean diameter ($D_{3,3}$) of the dispersed phase is suitably determined by means of the NMR method described by Van Duynhoven et al. (Eur. J. Lipid Sci. Technol. 109 (2007) 1095-1103).

The mayonnaise typically contains 0.5-10 wt. %, more preferably 2-8 wt. % and most preferably 3-7 wt. % egg yolk. Here the weight percentage refers to ordinary 'wet' egg yolk. It should be understood that the invention also encompasses the use of lyophilized egg yolk in equivalent amounts.

Preferably an additional oil-in-water emulsifier is incorporated in the mayonnaise prepared according to the method of the invention. The presence of such emulsifier may further enhance the oxidative stability of the oil. Emulsifier molecules at the oil-water interface may keep metal atoms away from the interface. These metal atoms, notably iron, are known to promote oil oxidation. The metal atoms may be bound to other ingredients in the composition, for example they may be bound to melanoidins originating from the reduced grape juice. Preferred emulsifiers are phospholipids and polyoxyethylene sorbitan monostearate, or a combination of both. The amount of the emulsifier preferably ranges from 0.1 wt. % to 2 wt. %, preferably from 0.2 wt. % to 1.5 wt. %, preferably from 0.3 wt. % to 1 wt. % by weight of the mayonnaise.

Another aspect of the present invention relates to an EDTA-free mayonnaise that is obtainable by the method described herein before. Even more preferably the EDTA-free mayonnaise is obtained by said method.

Another aspect of the present invention relates to an EDTA-free mayonnaise that comprises 5-85 wt. % of dispersed oil phase and 15-95 wt. % of continuous aqueous phase, further comprising:
- reduced grape juice in an amount providing 5-2,000 μg gallic acid equivalents per milliliter of aqueous phase, said reduced grape juice containing at least 50% by weight of dry matter of monosaccharides selected from glucose, fructose and combinations thereof;
- a source of acetic acid in an amount providing 0.2-15% acetic acid by weight of the continuous aqueous phase, said source of acetic acid containing at least 20% acetic acid by weight of dry matter; and
- egg protein in an amount of 0.02-4% by weight of the mayonnaise.

Preferably the reduced grape juice contains less than 0.1 wt. %, more preferably less than 0.05 wt. % and most preferably less than 0.01 wt. % of substances having a molecular weight of more than 20 kDa, more preferably of more than 10 kDa, more preferably of more than 5 kDa.

Preferred embodiments disclosed in the context of the method of the invention, are applicable to this aspect of the invention, providing an EDTA-free mayonnaise, *mutatis mutandis*.

A further aspect of the invention relates to the use of reduced grape juice as an EDTA-replacer in mayonnaise comprising 5-85 wt. % of dispersed oil phase and 15-95 wt. % of continuous aqueous phase, said use comprising incorporating the reduced grape juice in the mayonnaise in an amount providing 5-2,000 μg gallic acid equivalents per milliliter of aqueous phase, more preferably in an amount providing 10-600 μg gallic acid equivalents per milliliter of aqueous phase and most preferably in an amount providing 15-400 μg gallic acid equivalents per milliliter of aqueous phase. Preferably the reduced grape juice contains less than 0.1 wt. %, more preferably less than 0.05 wt. % and most preferably less than 0.01 wt. % of substances having a molecular weight of more than 20 kDa. Preferably the reduced grape juice contains less than 0.1 wt. %, more preferably less than 0.05 wt. % and most preferably less than 0.01 wt. % of substances having a molecular weight of more than 10 kDa and more preferably of more than 5 kDa. Preferably the reduced grape juice contains at least 50% by weight of dry matter of monosaccharides selected from glucose, fructose and combinations thereof.

Yet another aspect of the invention relates to a process of preparing an EDTA replacer, said process comprising:
providing reduced grape juice;
filtering the reduced grape juice to remove components having a molecular weight of more than 20 kDa; and
optionally further treating the filtered juice.

Preferably the reduced grape juice is filtered to remove components having a molecular weight of more than 10 kDa, more preferably of more than 5 kDa. As explained herein before, the removal of components having a molecular weight of more than 10 kDa effectively reduces the colour intensity of the reduced grape juice and makes it possible to use the thus decoloured reduced grape juice at appreciable levels in mayonnaise without substantially affecting the colour of the mayonnaise.

As a result of the filtration, the content of components having a molecular weight of more than 20 kDa expressed by weight of dry matter is reduced by at least a factor 2, more preferably by at least a factor 5 and most preferably by at least a factor 20. Preferably the content of components having a molecular weight of more than 10 kDa expressed by weight of dry matter is reduced by at least a factor 2, more preferably by at least a factor 5 and most preferably by at least a factor 20. More preferably the content of components having a molecular weight of more than 5 kDa expressed by weight of dry matter is reduced by at least a factor 2, more preferably by at least a factor 5 and most preferably by at least a factor 20. Preferably the filtered reduced grape juice contains less than 0.1 wt. %, more preferably less than 0.05 wt. % and most preferably less than 0.01 wt. % of substances having a molecular weight of more than 20 kDa, more preferably of more than 10 kDa, more preferably of more than 5 kDa.

Typically as a result of filtration, the absorbance at 400 nm is decreased by at least a factor 5, more preferably by at least a factor 8 and most preferably by at least a factor 10.

The invention is further illustrated by the following non-limiting examples.

EXAMPLES

Example 1

Mayonnaise samples were prepared in 200 g batches on the basis of the recipes (in wt. %) shown in Table 1.

TABLE 1

|  | 1 | 2 | 3 | 4 |
| --- | --- | --- | --- | --- |
| Oil | 76 | 76 | 76 | 76 |
| Balsamic vinegar |  |  |  | 5 |
| Cooked must |  |  | 4 |  |
| Spirit vinegar | 2.5 | 2.5 | 2.5 | 0 |
| EDTA |  | 0.008 |  |  |
| Sugar | 1.3 | 1.3 | 1.3 | 1.3 |
| Salt | 0.7 | 0.7 | 0.7 | 0.7 |
| Egg yolk | 3.9 | 3.9 | 3.9 | 3.9 |
| Mustard oil | 0.3 | 0.3 | 0.3 | 0.3 |
| Water | 15.3 | 15.3 | 11.3 | 12.8 |

The balsamic vinegar was an "Aceto balsamico di Modena I.G.P." obtained from Acetum, Italy. This vinegar is a blend of 80 wt. % dry cooked must and 20 wt. % wine vinegar and had been aged for 36 months. The specification of this balsamic vinegar is as follows:

| Total acidity (acetic acid): | 6.00-6.15 g/100 ml |
| --- | --- |
| pH | 2.0-3.5 |
| Total dried extract | 700-850 g/l |
| Total sugars | 600-720 g/l |

The content of phenolic compounds in this balsamic vinegar has been determined using the Folin Ciocalteu assay. The vinegar contains about 4550 μg gallic acid equivalents per milliliter; this number has been obtained after correction for the presence of reducing sugars (about 150 μg/ml GAE).

The cooked must is the same dry cooked must that is contained in the balsamic vinegar (but not aged).

The mayonnaise samples were prepared using the following procedure:
The egg yolk (5° C.), water-soluble ingredients, water and vinegar were mixed manually and added in a mixing bowl.
An oil phase consisting of soy bean oil and mustard oil was slowly added to the aqueous phase using a high speed mixer (Silverson, 3000 rpm). After addition of the oil phase mixing continued for 4 minutes at a higher stirrer speed (7000 rpm).

The pH of the samples was measured after 1 day and, if necessary, adjusted to pH 3.9.

All samples were subjected to an accelerated storage test followed by volatile analysis using the following procedure:
Approximately 20 gram emulsion was distributed among 20 headspace vials (Chrompack, 20 ml). The sample vials were capped and placed in an oven at 50° C. in the dark. The samples were left in the oven without stirring or mechanical agitation.
Triplicate samples were removed from the oven at regular time intervals and cooled down to ambient temperature in the dark. The samples were decapped and flushed for ca. 6 seconds with a nitrogen stream at a flow rate of 500 ml/min to prevent further oxidation. The samples are re-capped and stored at 20° C. until further analysis.
Samples oxidised for various lengths of time were collected for headspace analysis using a GC-17A gas chromatograph (Shimadzu). The samples were placed in an automated headspace sampler at 40° C. and allowed to equilibrate for at least 30 minutes. Headspace samples (0.25 ml) were taken with a gas-tight syringe and injected in split mode (ratio 1:20) onto a DB Wax column (J&W Scientific). Column specifications: length 20 m, diameter 0.18 mm and film thickness 0.3 mm. The chromatograph was equipped with a flame ionization detector. Temperatures at the inlet and detector were 200° C. and 280° C., respectively. The temperature programming for gas chromatographic analysis was: 33° C. (2 min)-35° C./min to 200° C. -200° C. (2 min). Gas flow (helium) through the column was at 1.0 ml per minute.

Samples were measured in random order to avoid systematic errors due to e.g. carry over effects. Peak areas (in μV.s) were quantified for the following oxidation off-flavours: acetaldehyde, propenal, propanal, pentane, 2t-butenal, 1-penten-3-one, 1-penten-3-ol, pentanal, 2t-pentenal and hexanal. Peak areas of triplicate samples were averaged.

Hexanal is a typical oxidation volatile and used as an indicator of oxidative stability. The lower the amount of volatiles, the less oil oxidation has occurred. Table 2 shows the hexanal levels found in the headspace of the emulsions at different stages of the accelerated oxidation test.

TABLE 2

| Time (in days) | 1 | 2 | 3 | 4 |
|---|---|---|---|---|
| 0 | 3,131 | 3,495 | 1,648 | 2,913 |
| 3 | 3,111 | 12,499 | 3,891 | 6,103 |
| 6 | 3,725 | 26,879 | 8,360 | 9,702 |
| 8 | 7,954 | 39,221 | 6,617 | 8,188 |
| 10 | 13,842 | 50,770 | 7,944 | 12,043 |
| 13 | 6,392 | 71,650 | 11,306 | 17,050 |
| 15 | 9,948 | 70,285 | 13,528 | 12,655 |
| 17 | 11,213 | 83,211 | 9,685 | 16,786 |
| 20 | 20,654 | 164,129 | 19,308 | 19,730 |
| 22 | 17,628 | 260,949 | 16,509 | 18,184 |
| 24 | 37,719 | 689,574 | 24,217 | 32,528 |
| 27 | 49,338 | 1,022,440 | 32,412 | 34,873 |
| 29 | 66,364 | 769,767 | 41,163 | 42,990 |
| 31 | 68,573 | 946,349 | 48,335 | 83,213 |
| 34 | 134,795 | 1,298,420 | 63,108 | 112,628 |

Similar results were obtained for the other volatiles detected, such as pentane, pentanal or pentene-3-one.

Example 2

Mayonnaise samples were prepared in 200 g batches on the basis of the recipes described in Table 3 (in wt. %), using the procedure described in example 1.

TABLE 3

|  | 1 | 2 | 3 | 4 |
|---|---|---|---|---|
| Oil | 76 | 76 | 76 | 76 |
| Balsamic vinegar |  | 1.5 |  | 1.5 |
| Rosemary extract |  |  |  | 0.1 |
| Spirit vinegar | 2.5 | 2.5 | 1.75 | 1.75 |
| EDTA | 0.008 |  |  |  |
| Sugar | 1.3 | 1.3 | 1.3 | 1.3 |
| Salt | 0.7 | 0.7 | 0.7 | 0.7 |
| Egg yolk | 3.9 | 3.9 | 3.9 | 3.9 |
| Mustard oil | 0.3 | 0.3 | 0.3 | 0.3 |
| Water | 15.3 | 15.3 | 14.55 | 14.45 |

The balsamic vinegar was the same as in example 1.

The rosemary extract (Guardian rosemary extract 201) was obtained from Danisco.

All samples were subjected to the accelerated storage test and volatile analyses as described in example 1.

Table 4 shows the hexanal levels found in the headspace of the emulsions at different stages of the accelerated oxidation test.

TABLE 4

| Time (in days) | 1 | 2 | 3 | 4 |
|---|---|---|---|---|
| 0 | 1,062 | 1,349 | 1,207 | 366 |
| 2 | 556 | 40,336 | 6,567 | 4,772 |
| 5 | 3,665 | 530,070 | 25,277 | 18,646 |
| 7 | 5,849 | 1,299,915 | 36,055 | 20,996 |
| 9 | 11,620 | 2,702,457 | 51,462 | 29,094 |
| 12 | 25,656 | 2,979,348 | 238,333 | 47,108 |
| 14 | 33,815 | 3,555,168 | 788,956 | 56,602 |
| 16 | 89,466 | 3,187,306 | 1,815,046 | 92,968 |
| 19 | 257,708 | 3,895,275 | 2,412,717 | 171,258 |
| 21 | 396,588 | 3,068,176 | 2,304,786 | 786,859 |
| 23 | — | 3,535,352 | 1,874,919 | 791,812 |
| 26 | 923,902 | 3,482,733 | 2,156,975 | 1,823,567 |
| 28 | 3,276,075 | 4,402,565 | 2,701,923 | 1,742,624 |

Example 3

The balsamic vinegar described in example 1 was used as a starting material for the isolation of a high molecular fraction (HMW) and a low molecular fraction (LMW).

The HMW fraction was prepared by alcohol precipitations as follows:
   Ethanol (pure) was slowly added to balsamic vinegar while stirring. Ratio: 70% ethanol, 30% balsamic vinegar (on weight)
   Ethanol/balsamic vinegar mixture was equilibrated for 15 hours at room temperature
   Mixture was centrifuged at 15.000×g during 15 min
   Sediment (=precipitated melanoidins+low molecular weight sugars) was collected
   Sediment was redispersed into millipore water
   Low molecular weight sugars (fructose, glucose) were removed by ultrafiltration (Amicon, 3 kDa filter, regenerated cellulose)
   Ultrafiltration procedure was repeated 2×
   Retentate was lyophilized
   Seventeen grams of balsamic vinegar yielded one gram of lyophilized HMW fraction.

The LMW fraction was prepared by subjecting the balsamic vinegar to ultrafiltration, using the same ultrafilter used in the isolation of the HMW fraction and by recovering the permeate.

The balsamic vinegar and the fractions obtained therefrom were used in the preparation of mayonnaise samples on the basis of the recipes described in Table 5 (in wt. %), using the procedure described in example 1. Again, EDTA-free and EDTA-containing control samples were included in the experiment.

TABLE 5

|  | 1 | 2 | 3 | 4 | 5 |
|---|---|---|---|---|---|
| Oil | 76 | 76 | 76 | 76 | 76 |
| Spirit vinegar | 2.5 | 2.5 | 0 | 2.5 | 0 |
| Balsamic vinegar |  |  | 5 |  |  |
| Balsamic vinegar (HMW) |  |  |  | 0.25 |  |
| Balsamic vinegar (LMW) |  |  |  |  | 5 |
| EDTA | 0.008 |  |  |  |  |
| Sugar | 1.3 | 1.3 | 1.3 | 1.3 | 1.3 |
| Salt | 0.7 | 0.7 | 0.7 | 0.7 | 0.7 |
| Egg yolk | 3.9 | 3.9 | 3.9 | 3.9 | 3.9 |
| Mustard oil | 0.3 | 0.3 | 0.3 | 0.3 | 0.3 |
| Water | 15.3 | 15.3 | 12.8 | 15.05 | 12.8 |

Visual observation showed that sample 5 had a lighter colour than sample 3. All samples were subjected to the accelerated storage test and volatile analyses as described in example 1.

Table 6 shows the hexanal levels found in the headspace of the emulsions at different stages of the accelerated oxidation test.

TABLE 6

| Time (in days) | 1 | 2 | 3 | 4 | 5 |
|---|---|---|---|---|---|
| 0 | 3,131 | 3,495 | 2,913 | 3,624 | 2,239 |
| 3 | 3,111 | 12,499 | 6,103 | 13,062 | 5,303 |
| 6 | 3,725 | 26,879 | 9,702 | 28,254 | 6,765 |
| 8 | 7,954 | 39,221 | 8,188 | 35,766 | 5,711 |
| 10 | 13,842 | 50,770 | 12,043 | 51,133 | 15,348 |
| 13 | 6,392 | 71,650 | 17,050 | 47,820 | 12,034 |
| 15 | 9,948 | 70,285 | 12,655 | 98,761 | 15,067 |
| 17 | 11,213 | 83,211 | 16,786 | 96,283 | 20,241 |
| 20 | 20,654 | 164,129 | 19,730 | 175,229 | 18,743 |
| 22 | 17,628 | 260,949 | 18,184 | 207,718 | 19,846 |
| 24 | 37,719 | 689,574 | 32,528 | 727,382 | 31,756 |
| 27 | 49,338 | 1,022,440 | 34,873 | 748,862 | 37,791 |
| 29 | 66,364 | 769,767 | 42,990 | 735,513 | 48,224 |
| 31 | 68,573 | 946,349 | 83,213 | 576,816 | 54,765 |
| 34 | 134,795 | 1,298,420 | 112,628 | 1,770,213 | 82,653 |

Example 4

Three different emulsions were prepared in 100 gram batches on the basis of the recipes shown in Table 7 (in wt. %).

TABLE 7

|  | 1 | 2 | 3 |
|---|---|---|---|
| sunflower oil | 10 | 10 | 10 |
| balsamic vinegar | 45 |  | 45 |
| white vinegar |  | 45 |  |
| Tween 60 | 0.9 | 0.9 |  |
| millipore water | 44.1 | 44.1 | 45 |

The balsamic vinegar was an Aceto balsamico di Modena I.G.P. obtained from Acetum, Italy. This balsamic vinegar was made from a cooked grape must similar to the one contained in the balsamic vinegar that was used in the previous examples. The balsamic vinegar had been prepared from cooked grape must (40%) and red wine vinegar (60%) and had been aged for a period of at least 2 months in oak barrels. The balsamic vinegar contained 6% acetic acid, 25-30 wt. % sugars and 3229 μg gallic acid equivalents per milliliter (corrected for the presence of reducing sugars, approximately 100 μg/ml GAE).

The white spirit vinegar (6% acetic acid) was obtained from Kühne Benelux BV (The Netherlands).

Tween 60 (polyoxyethylene sorbitan monostearate) was obtained from Acros Organics.

The emulsions were prepared as follows:

Tween 60 was first dissolved in millipore water at a concentration of 2% by weight. 10 gram sunflower oil was then dispersed in 45 gram of the Tween 60 solution using a high shear mixer (Silverson, 7000 RPM, 10 minutes). The emulsion obtained was then mixed with 45 gram balsamic vinegar (sample 1) or 45 gram white vinegar (sample 2). Mixing was performed manually with a spatula for 5 minutes.

Sample 3 did not contain Tween 60. In this case 10 gram sunflower oil was dispersed directly in 45 gram balsamic vinegar using a Silverson mixer (7000 RPM, 10 minutes). The emulsion was then mixed manually with 45 gram millipore water.

pH of the samples was adjusted to 3.8 using 1 N NaOH. A small increase of pH was observed after equilibration of the samples.

All samples had a pH of approximately 3.9 and an oil droplet size (Sauter mean diameter $D_{3,2}$) of about 5 μm.

All samples were subjected to an accelerated storage test followed by volatile analysis. The volatile analysis was carried out as described in example 1. The accelerated storage test only differed from the accelerated storage test described in example 1 in that the samples were kept at 60° C. instead of 50° C. and in that duplicate rather than triplicate samples were analysed.

Table 8 shows the hexanal levels found in the headspace of the emulsions at different stages of the accelerated oxidation test.

TABLE 8

| Time (in hours) | 1 | 2 | 3 |
|---|---|---|---|
| 0 | 749 | 372 | 1,504 |
| 24 | 10,816 | 12,390 | 23,677 |
| 48 | 24,234 | 71,485 | 79,488 |
| 68 | 36,633 | 126,472 | 224,059 |
| 92 | 54,142 | 849,512 | 733,857 |
| 116 | 55,079 | 1,587,410 | 1,508,078 |
| 142 | 84,644 | 1,654,434 | 1,717,709 |
| 168 | 247,712 | 1,699,034 | 1,904,078 |
| 240 | 1,072,620 | 1,609,590 | 1,929,993 |
| 308 | 1,539,688 | 1,815,592 | 2,650,217 |

Similar results were obtained for the other volatiles detected, such as pentane, pentanal or pentene-3-one.

Metal ion content is one of the important factors controlling lipid oxidation in emulsions. The balsamic vinegar used in this experiment contained a relatively high amount of iron (ca. 10 mg/kg). The white vinegar had a significantly lower iron content (<0.055 mg/kg). In spite of a lower metal ion content, the emulsion containing white vinegar (sample 2) was found to oxidise much faster than an identical emulsion containing balsamic vinegar instead of white vinegar (sample 1).

The results shown in Table 8 indicate that oxidation in the emulsion containing balsamic vinegar and Tween 60 (sample 1) proceeds at a much lower rate than the emulsion containing white vinegar and Tween 60 (sample 2). Furthermore, these results show that in the absence of Tween 60 (sample 3) the emulsion containing balsamic vinegar oxidizes at a much higher rate than in case these emulsion additionally contains Tween 60.

The effect of Tween 60 is deemed to be related to differences in the composition of the droplet interface and the physical location of pro- and antioxidants in the emulsion. As oxidation is initiated at the oil-water interface, both pro- and antioxidants are more effective when they are localised at or near the droplet surface. Emulsifiers can alter the location and thereby promote or retard lipid oxidation.

In the absence of Tween 60 oil droplets of the emulsion containing balsamic vinegar are believed to be covered by high molecular weight melanoidins. As melanoidins have metal chelating properties, binding of metal ions by these melanoidins will cause an accumulation of metal ions near the oil droplet surface. This accumulation of metal ions can accelerate the rate of oxidation and thereby counteract any positive (radical scavenging) effects of melanoidins. In the presence of Tween 60 (right) emulsifier molecules will compete with surface active melanoidins for a position at the interface. It is assumed that as a result of this competition a major portion of the oil droplet surface will be occupied by Tween 60 molecules and that melanoidins (and metal ions associated with them) will be mainly located in the aqueous phase of the emulsion, away from the oil droplet surface. The lower metal ion concentration at the oil droplet surface is believed to explain the slower oxidation in the presence of Tween 60.

Example 5

Example 4 is repeated except that this time instead of Tween 60 egg yolk is added to samples 1 and 2 (2 wt. %). Moreover the balsamic vinegar that is used in this example 5 is the same as in example 1. The composition of the samples is shown in Table 9.

TABLE 9

|  | 1 | 2 | 3 |
|---|---|---|---|
| sunflower oil | 10 | 10 | 10 |
| balsamic vinegar | 45 |  | 45 |
| white vinegar |  | 45 |  |
| egg yolk | 2 | 2 |  |
| millipore water | 43 | 43 | 45 |

Table 10 shows the hexanal levels found in the headspace of the emulsions at different stages of the accelerated oxidation test.

TABLE 10

| Time (in days) | 1 | 2 | 3 |
|---|---|---|---|
| 0 | 1,862 | 2,069 | 3,041 |
| 1 | 5,334 | 147,882 | 18,504 |
| 3 | 10,808 | 790,140 | 16,071 |
| 6 | 15,294 | 5,040,555 | 34,746 |
| 8 | 20,072 | 11,678,692 | 55,614 |
| 10 | 27,648 | 18,097,389 | 108,242 |
| 13 | 66,731 | 32,264,577 | 194,545 |

The oxidation stability of sample 1 is found to be significantly higher than that of samples 2 and 3.

What is claimed is:

1. An EDTA-free mayonnaise that comprises:
   5-85 wt. % of a dispersed oil phase; and
   15-95 wt. % of a continuous aqueous phase, wherein the continuous aqueous phase comprises:
   reduced grape juice in an amount providing 5-2,000 µg gallic acid equivalents per milliliter of aqueous phase, said reduced grape juice containing at least 50% by weight of dry matter of monosaccharides selected from glucose, fructose and combinations thereof;
   a source of acetic acid in an amount providing 0.2-15% acetic acid by weight of the continuous aqueous phase, said source of acetic acid containing at least 20% acetic acid by weight of dry matter; and
   egg protein in an amount of 0.02-4% by weight of the mayonnaise.

2. The EDTA-free mayonnaise of claim 1, wherein the reduced grape juice contains 50-50,000 µg/g gallic acid equivalents.

3. The EDTA-free mayonnaise of claim 1, wherein the reduced grape juice has a dry matter content of at least 20 wt. %.

4. The EDTA-free mayonnaise of claim 1, wherein the reduced grape juice is mosto cotto.

5. The EDTA-free mayonnaise of claim 1, wherein the reduced grape juice contains phenolic acids in a concentration of 0.03-30 mg per g of dry matter.

6. The EDTA-free mayonnaise of claim 5, wherein the phenolic acids are selected from the group consisting of gallic acid, protocatecuic acid, p-coumaric acid, syringic acid, vanillic acid, 4-hydroxybenzoic acid, feluric acid, caffeic acid, and combinations thereof.

7. The EDTA-free mayonnaise of claim 1, wherein the reduced grape juice contains 60-95% monosaccharides by weight of dry matter.

8. The EDTA-free mayonnaise of claim 1, wherein the monosaccharides are selected from the group consisting of fructose, glucose, and combinations thereof.

9. The EDTA-free mayonnaise of claim 1, wherein the reduced grape juice contains 50-25,000 mg per kg of dry matter of Maillard reaction products.

10. The EDTA-free mayonnaise of claim 9, wherein the Maillard reaction products are selected from the group consisting of furfural, 5-methyl-2-furaldehyde, 5-hydroxymethylfuraldehyde, 5-acetoxymethylfurfural, 2-furoic acid, and combinations thereof.

11. The EDTA-free mayonnaise of claim 1, wherein the source of acetic acid is selected from the group consisting of wine vinegar, sherry vinegar, spirit vinegar, rice vinegar, apple vinegar, malt vinegar and combinations thereof.

12. The EDTA-free mayonnaise of claim 1, wherein the acetic acid contains less than 15% monosaccharides by weight of dry matter.

13. The EDTA-free mayonnaise of claim 12, wherein the monosaccharides are selected from the group consisting of fructose, glucose, and combinations thereof.

14. The EDTA-free mayonnaise of claim 1, wherein the EDTA-free mayonnaise contains 0.5-10 wt. % egg yolk.

15. The EDTA-free mayonnaise of claim 1, wherein the reduced grape juice contains less than 0.1 wt. % of substances having a molecular weight of more than 20 kDa.

16. The EDTA-free mayonnaise of claim 15, wherein the reduced grape juice contains less than 0.05 wt. % of substances having a molecular weight of more than 20 kDa.

17. The EDTA-free mayonnaise of claim 15, wherein the reduced grape juice contains less than 0.01 wt. % of substances having a molecular weight of more than 20 kDa.

\* \* \* \* \*